(12) United States Patent
Duan et al.

(10) Patent No.: US 7,672,394 B2
(45) Date of Patent: Mar. 2, 2010

(54) TRANSMISSION APPARATUS AND TRANSMISSION METHOD

(75) Inventors: Jinsong Duan, Yokohama (JP); Daisuke Yamada, Yokohama (JP)

(73) Assignee: Panasonic Corporation, Osaka (JP)

( * ) Notice: Subject to any disclaimer, the term of this patent is extended or adjusted under 35 U.S.C. 154(b) by 967 days.

(21) Appl. No.: 10/573,688

(22) PCT Filed: Sep. 27, 2004

(86) PCT No.: PCT/JP2004/014058

§ 371 (c)(1),
(2), (4) Date: Mar. 27, 2006

(87) PCT Pub. No.: WO2005/034458

PCT Pub. Date: Apr. 14, 2005

(65) Prior Publication Data

US 2006/0291579 A1    Dec. 28, 2006

(30) Foreign Application Priority Data

Sep. 30, 2003    (JP)    ............... 2003-341718

(51) Int. Cl.
H04L 27/00    (2006.01)
(52) U.S. Cl. .................................... 375/295
(58) Field of Classification Search ................ 375/295, 375/262, 265, 302, 308
See application file for complete search history.

(56) References Cited

U.S. PATENT DOCUMENTS

| 7,280,606 | B2* | 10/2007 | Kim et al. .................. 375/295 |
| 7,302,012 | B2* | 11/2007 | Kim et al. .................. 375/316 |
| 2002/0163975 | A1 | 11/2002 | Uesugi et al. |
| 2003/0012295 | A1 | 1/2003 | Matsumoto et al. |
| 2003/0072292 | A1* | 4/2003 | Yoon et al. .................. 370/342 |
| 2003/0081576 | A1 | 5/2003 | Kim et al. |

(Continued)

FOREIGN PATENT DOCUMENTS

JP    2002 171298    6/2002

(Continued)

OTHER PUBLICATIONS

Enhanced HARQ Method with Signal Constellation Rearrangement, TSG-RAN Working Group 1 Meeting #19 TSGRI#I9(01)0237, Mar. 2, 2001.*

(Continued)

Primary Examiner—Chieh M Fan
Assistant Examiner—Jaison Joseph
(74) Attorney, Agent, or Firm—Dickinson Wright PLLC

(57) ABSTRACT

A transmission apparatus capable of preventing both degrading of the error rate characteristic and deterioration of throughput caused by repeated retransmissions. In the apparatus, arrangement determination section 103 determines in an initial transmission to perform general constellation mapping, and determines in a retransmission to vary a constellation mapping position or vary a bit arrangement of each symbol according to the number of retransmissions. Data interchanging section 105 interchanges transmission data for each bit on a symbol basis to be in a bit arrangement determined by arrangement determining section 103. Mapper section 106 configures (maps) the transmission data input from data interchanging section 105 in each symbol to be mapped in the constellation mapping position determined in arrangement determining section 103.

4 Claims, 10 Drawing Sheets

U.S. PATENT DOCUMENTS

2004/0049725 A1 3/2004 Golitschek et al.
2005/0279532 A1* 12/2005 Ballantyne et al. ............ 175/40
2006/0039409 A1* 2/2006 Lampinen ................... 370/474
2006/0291579 A1* 12/2006 Duan et al. ................. 375/264

FOREIGN PATENT DOCUMENTS

JP 2002 199037 7/2002
JP 2003 152680 5/2003
WO 02 067491 8/2002

OTHER PUBLICATIONS

Enhanced HARQ Method with Signal Constellation Rearrangement, TSG-RAN Working Group 1 Meeting#19 TSGR1#19(01)0237, Mar. 2, 2001.

S. Kallel; "Analysis of a Type II Hybrid ARQ Scheme with Code Combining," IEEE Transactions on Communications, vol. 38, No. 8, Aug. 1990, pp. 1133-1137.

S. Kallel, et al.; "Throughout Performance of Memory ARQ Schemes," IEEE Transactions on Vehicular Technology, vol. 48, No. 3, May 1999, pp. 891-899.

* cited by examiner

| THE NUMBER OF TRANSMISSIONS | CONSTELLATION PATTERN | DATA INTERCHANGING RULE |
| --- | --- | --- |
| 1 (INITIAL TRANSMISSION) | Constellation 1 (ORIGINAL CONSTELLATION) | — |
| 2 | Constellation 2 | SWAP |
| 3 | Constellation 3 | Inversion |
| 4 | Constellation 4 | Rotational Shift |
| 5 | Constellation 5 | Radius Circle Shift |
| 6 | Constellation 6 | Rotational Shift & Inversion |

FIG.6

TRANSMISSION APPARATUS AND TRANSMISSION METHOD

TECHNICAL FIELD

The present invention relates to a transmission apparatus and transmission method for performing retransmission of erroneous data.

BACKGROUND ART

The technique conventionally used in communication systems having channel conditions with low reliability and varying with time is to perform error correction based on an Automatic Repeat Request (ARQ) system and Forward Error Correction (FEC) technique, and called hybrid ARQ (HARQ). When an error is detected by well-used Cyclic Redundancy Check (CRC), a receiving section in the communication system requests a transmitting section to retransmit a data packet that is erroneously received (for example, Non-patent Document 1 and Non-patent Document 2).

DISCLOSURE OF INVENTION

The ARQ system includes three different types, types I to III.

Type I is a scheme where a received packet containing an error is discarded, a new copy of the same packet is separately retransmitted and decoded, and previous and new packets received are not combined.

Type II is a scheme where a received packet containing an error is not discarded, and combined with an additionally retransmitted packet, and decoding is continuously performed. The retransmitted packet has a relatively high coding rate (coding gain), and is sometimes combined with stored soft-information obtained from previous transmission in a receiving section.

Type III is almost the same as aforementioned type II, and a scheme where each retransmitted packet can automatically be decoded. This means that a transmitted packet can be decoded without being combined with a previous packet, and such a scheme is useful when part of a packet is so damaged that the information can hardly be reused.

FIG. 1 is a diagram illustrating mapping of each symbol in an 8 PSK modulation scheme. In 8 PSK, since eight mapping positions exist in the IQ plane, three bits can be included and transmitted in a single symbol. In each symbol, a most significant bit a1 is a first bit, a2 next to the most significant bit a1 is a second bit, and a least significant bit a3 is a third bit.

[Non-patent Document 1] S. Kallel, "Analysis of a type II hybrid ARQ scheme with code combining", IEEE Transactions on Communications, Vol. 38, No. 8, August 1990

[Non-patent Document 2] S. Kallel, R. Link, S. Bakhtiyari, "Throughput performance of Memory ARQ schemes", IEEE Transactions on Vehicular Technology, Vol. 48, No. 3, May 1999

DISCLOSURE OF INVENTION

Problems To Be Solved By The Invention

In the conventional transmission apparatus and transmission method, retransmission data of each symbol is retransmitted in the same propagation path as that in the first transmission, and such a problem arises that an error occurs in the same data repeatedly. Then, when an error occurs in the same data repeatedly, the retransmission is repeated, which results in another problem that the throughput deteriorates.

Further, in the conventional transmission apparatus and transmission method, in each symbol, decision regions of the first and second bits are different from a decision region of the third bit, and error rate characteristics are thus different between the first and second bits and third bit, resulting in another problem that the error rate characteristic of the third bit degrades.

FIGS. 2 to 4 are diagrams showing the decision regions respectively for bits a1 to a3. FIG. 2 is a diagram showing a decision region of the first bit, and the first bit can be decided using a line with an angle of 22.5 degrees from the I axis as threshold #10. In other words, section 1 above threshold #10 is a decision region for "0", while section 2 under threshold #10 is a decision region for "1".

FIG. 3 is a diagram showing a decision region of the second bit, and the second bit can be decided using a line with an angle of 67.5 degrees from the I axis as threshold #11. In other words, section 1 under threshold #11 is a decision region for "0", while section 2 above threshold #11 is a decision region for "1".

FIG. 4 is a diagram showing a decision region of the third bit, and the third bit can be decided using thresholds #12 and #13. In other words, section 1 that is under threshold #12 and above threshold #13 is a decision region for "0", section 2 that is above threshold #12 and above threshold #13 is a decision region for "1", section 3 that is above threshold #12 and under threshold #13 is a decision region for "0", and section 4 that is under threshold #12 and under threshold #13 is a decision region for "1".

It is understood from FIGS. 2 to 4 that two decision regions exist for each of the first and second bits, while four regions exist for the third bit. Accordingly, a Euclidean distance between decision regions for "0" and "1" in the third bit is smaller than a Euclidean distance between decision regions for "0" and "1" in each of the first and second bits, and a problem arises that the third bit tends to be erroneous easier than the first and second bits. When an error occurs in the third bit, a method of retransmitting the data is considered, but the error rate characteristic of the third bit of the retransmission data still has a higher possibility of degradation than that of the first and second bits, resulting in a problem that the throughput deteriorates by repeating retransmissions.

It is an object of the present invention to provide a transmission apparatus and transmission method capable of preventing degrading of the error rate characteristic and further preventing deterioration of throughput caused by repeated retransmissions.

Means For Solving The Problem

A transmission apparatus of the present invention adopts a configuration provided with an arrangement determiner that determines a constellation mapping position indicating an arrangement position of each symbol data in the IQ plane when transmission data is retransmitted so that the constellation mapping position becomes different from that in a last transmission, a data assigner that assigns transmission data to each symbol so that each symbol data with the same amplitude is arranged in the constellation mapping position determined by the arrangement determiner, and a transmitter that transmits the transmission data that is assigned to each symbol by the data assigner.

Further, a transmission apparatus of the invention adopts a configuration provided with a data interchanger that interchanges predetermined bits of transmission data so that a bit arrangement of each symbol, when the transmission data is retransmitted, becomes different from that in a last transmission, a data assigner that assigns the transmission data interchanged by the data interchanger to each symbol so that each of a plurality of items of symbol data with the same amplitude is arranged in a constellation mapping position indicating an arrangement position of each symbol of the transmission data in the IQ plane, and a transmitter that transmits the transmission data that is assigned to each symbol by the data assigner.

A transmission method of the invention has the steps of determining a constellation mapping position indicating an arrangement position of each symbol in the IQ plane when transmission data is retransmitted so that the constellation mapping position in retransmitting transmission data becomes different from that in a last transmission, assigning transmission data to each symbol so that each symbol data is arranged in the determined constellation mapping position, and transmitting the transmission data assigned to each symbol.

Advantageous Effect Of The Invention

According to the invention, it is possible to prevent the error rate characteristic from degrading, while further preventing deterioration of the throughput caused by repeated retransmissions.

BRIEF DESCRIPTION OF DRAWINGS

FIG. 6 shows a table storing rule selection information according to the Embodiment of the invention;

BEST MODE FOR CARRYING OUT THE INVENTION

An Embodiment of the invention will specifically be described below with reference to accompanying drawings.

Embodiment

Figure 5:
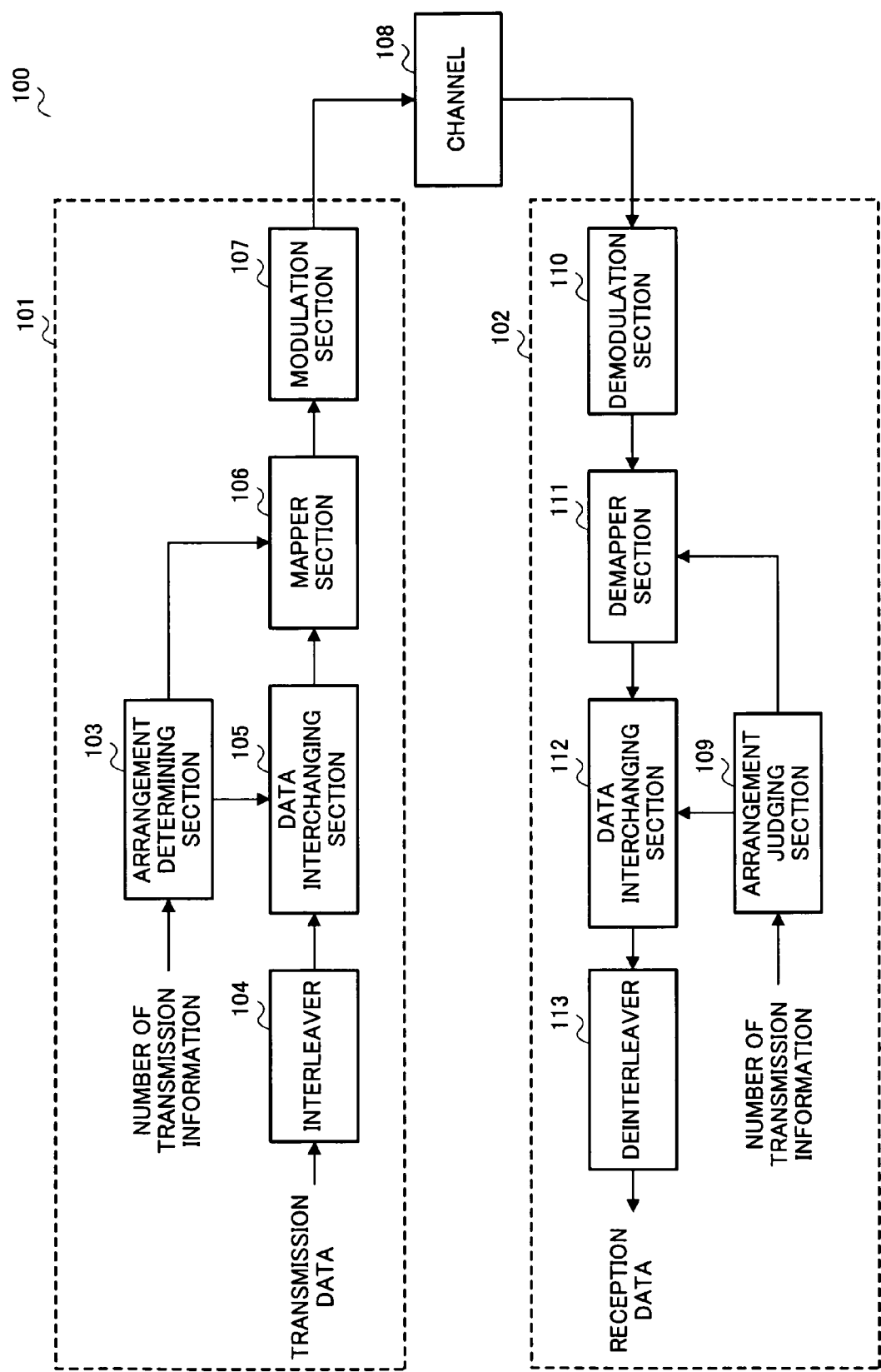
FIG. 5 is a block diagram illustrating a configuration of a communication system according to an Embodiment of the invention.

FIG. 5 is a block diagram illustrating a configuration of communication system 100 according to an embodiment of the invention. Transmission apparatus 101 is configured with arrangement determining section 103, interleaver 104, data interchanging section 105, mapper section 106, and modulation section 107. Reception apparatus 102 is configured with arrangement judging section 109, demodulation section 110, demapper section 111, data interchanging section 112 and deinterleaver 113.

From number-of-transmission information, arrangement determining section 103 determines in an initial transmission to perform general constellation mapping predetermined for each modulation scheme, and determines in a retransmission to vary whether a constellation mapping position or a bit arrangement of each symbol according to the number of retransmissions. Arrangement determining section 103 instructs mapper section 106 to vary a constellation mapping position when determining to vary the constellation mapping position, while instructing data interchanging section 105 to vary a bit arrangement when determining to vary the bit arrangement.

Interleaver 104 rearranges transmission data for each bit and outputs to data interchanging section 105. Data interchanging section 105 interchanges the transmission data input from interleaver 104 for each bit on a symbol basis (one symbol contains three bits in 8PSK) so as to be arranged in the bit arrangement determined by arrangement determining section 103 in accordance with the instruction of arrangement determining section 103. In case of 8 PSK, data interchanging section 105 performs processing of dividing a data sequence for each symbol so that one symbol contains three bits, and subsequently, performs interchanging processing for each bit on each symbol. Then, data interchanging section 105 outputs the transmission data interchanged for each bit to mapper section 106. When arrangement determining section 103 determines only to vary a constellation mapping position of symbol data, i.e. when data interchanging section 105 is not instructed from arrangement determining section 103, the transmission data input from interleaver 104 is output from data interchanging section 105 to mapper section 106 without any processing. A method for interchanging transmission data for each bit will be described later.

Mapper section 106 that is a data assigner, in accordance with the instruction of arrangement determining section, configures (maps) the transmission data input from data interchanging section 105 in each symbol so as to be mapped in the constellation mapping position determined by arrangement determining section 103. Mapper section 106 outputs the transmission data configured in each symbol to modulation section 107. Meanwhile, when not instructed anything from arrangement determining section 103, mapper section 106 configures the transmission data in each symbol so as to be mapped in a general constellation mapping position predetermined for each modulation scheme. In addition, a method will be described later for varying the constellation mapping position of each symbol data.

Modulation section 107 modulates the transmission data input from mapper section 106 with a predetermined modulation scheme and outputs to channel 108. In addition, when transmission data is transmitted by radio signal, the transmission data output from modulation section 107 is up converted from a baseband frequency to radio frequency and transmitted from an antenna via a radio communication channel.

Channel 108 is generally a radio communication channel and transmits the transmission data transmitted from transmission apparatus 101 to reception apparatus 102.

Arrangement judging section 109 knows the constellation mapping position or bit arrangement corresponding to the number-of-transmission information shared with arrangement determining section 103. Then, arrangement judging section 109 does not output anything in an initial reception, and when receiving retransmitted data, generates restoration information to restore the constellation mapping position of the received data to a general constellation mapping position corresponding to the number-of-transmission information, and outputs the generated restoration information to data interchanging section 112 or demapper section 111. More specifically, when arrangement judging section receives the data where a bit arrangement of each symbol is varied, the restoration information is output to data interchanging section 112, while when receives the data where a constellation mapping position of each symbol data is varied, the restoration information is output to demapper section 111.

Demodulation section 110 demodulates the received data to output to demapper section 111. More specifically, demodulation section 110 configures (maps) the received data in the constellation mapping position for each bit, and decides "1" and "0" of the received data for each bit using a threshold based on the constellation mapping position where the data is mapped.

According to the restoration information input from arrangement judging section 109, with respect to the received data input from demodulation section 110, demapper section 111 re-configures the transmission data so as to be arranged in the general constellation mapping position, and obtains a predetermined reception data sequence to output to data interchanging section 112. Meanwhile, when the restoration information is not input from arrangement judging section 109, demapper section 111 obtains a predetermined reception data sequence without re-placing the transmission data and outputs to data interchanging section 112.

According to the restoration information input from arrangement judging section 109, data interchanging section 112 interchanges each bit data for each symbol data with respect to the received data input from demapper section 111. Then, data interchanging section 112 outputs the received data interchanged for each bit to deinterleaver 113. In addition, when receiving the data where only the constellation mapping position of symbol data is varied, i.e. not receiving anything from arrangement judging section 109, data interchanging section 112 outputs the received data input from demapper section 111 to deinterleaver 113 without any processing.

Deinterleaver 113 rearranges the received data input from data interchanging section 112 and obtains reception data.

With reference to FIGS. 6 to 15, a method will be described below for varying the constellation mapping position in the 8 PSK modulation scheme.

Arrangement determining section 103 holds a rule table that stores rule selection information as shown in FIG. 6, and selects a rule to interchange data by using the number-of-transmission information and referring to the rule table.

Figure 1:
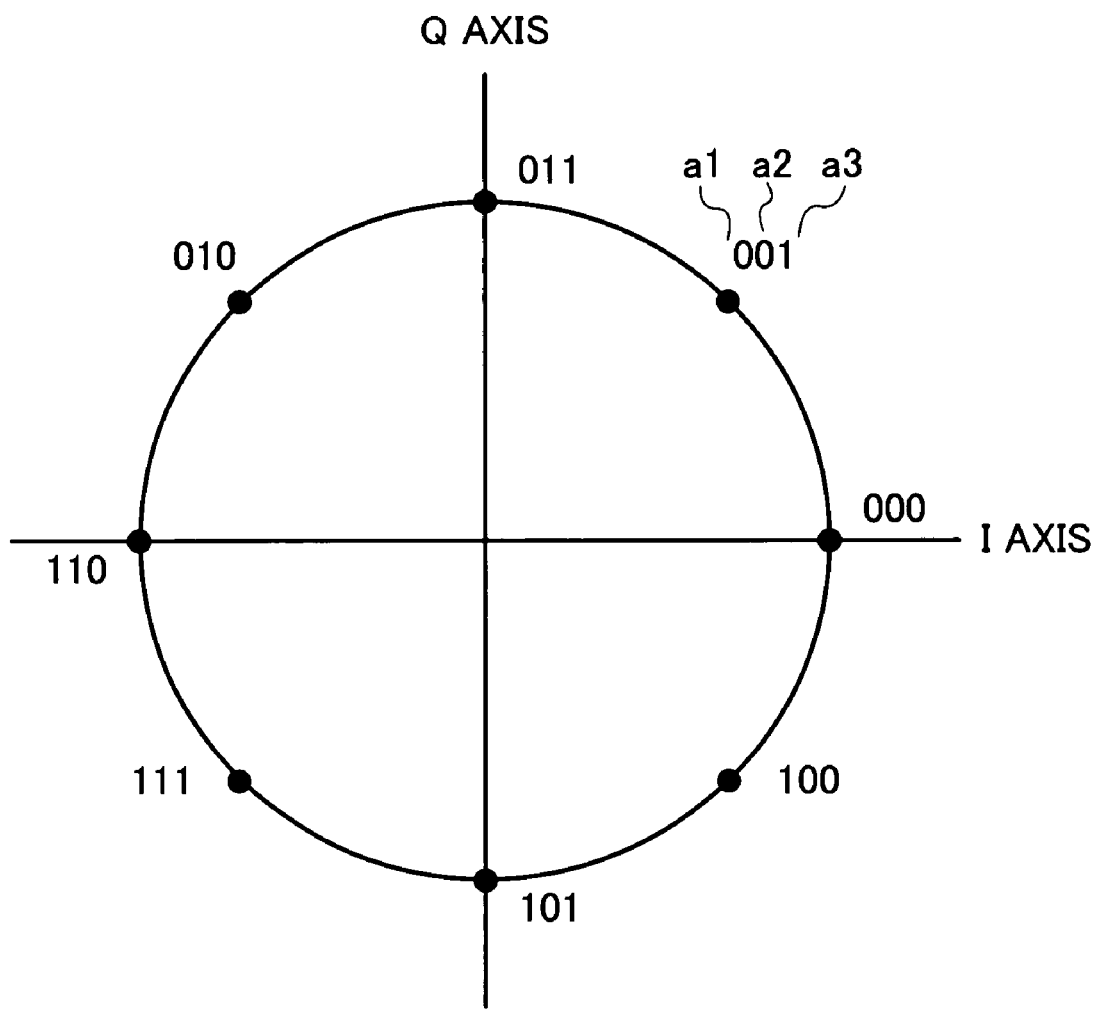
FIG. 1 is a diagram showing conventional constellation mapping.
Figure 2:
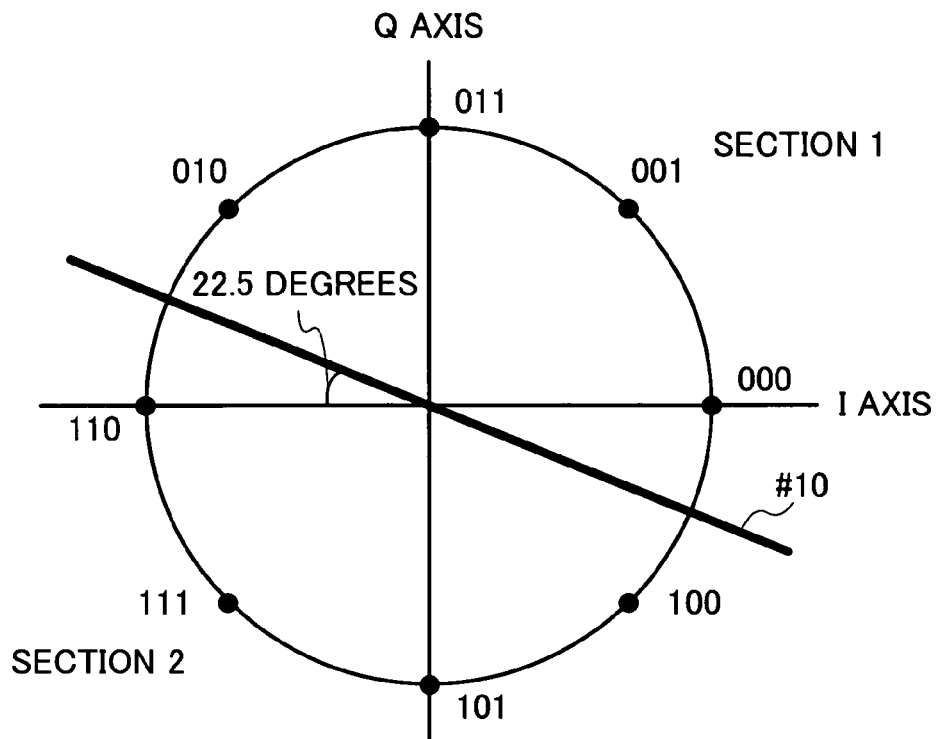
FIG. 2 is another diagram showing the conventional constellation mapping.
Figure 3:
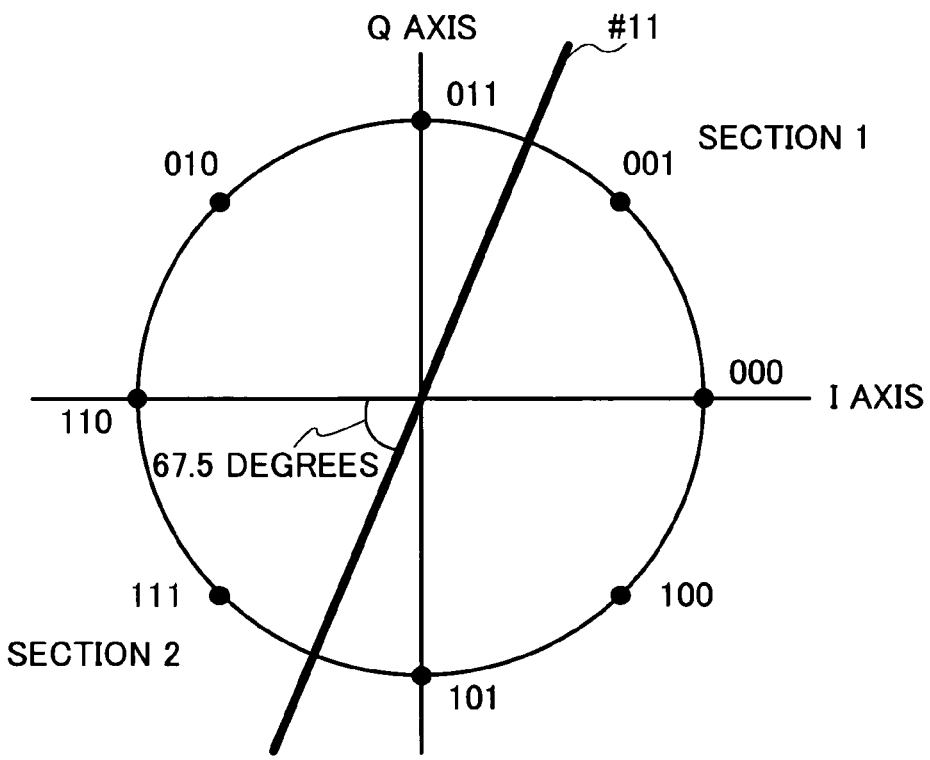
FIG. 3 is another diagram showing the conventional constellation mapping.
Figure 4:
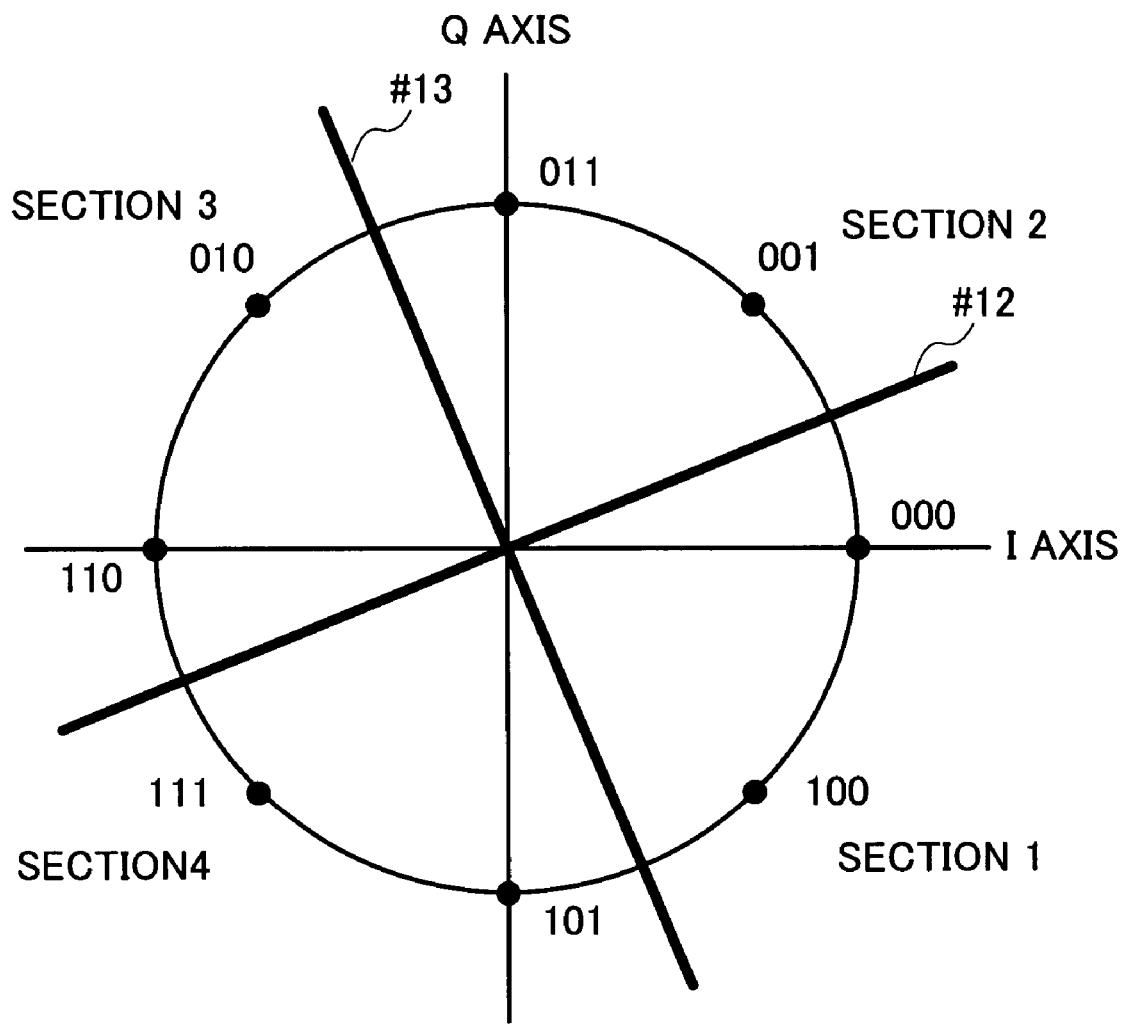
FIG. 4 is still another diagram showing the conventional constellation mapping.

When the number of transmissions is one (in an initial transmission that is not a retransmission), arrangement determining section 103 determines Constellation 1 that is a constellation pattern to map in general constellation mapping positions of 8 PSK as shown in FIG. 1.

Figure 7:
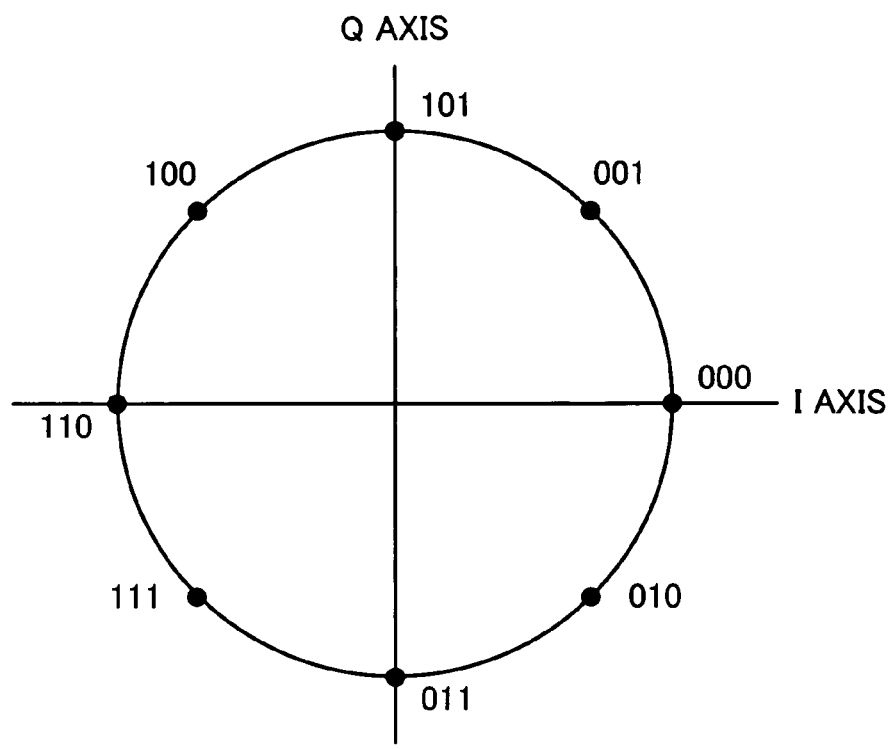
FIG. 7 is a diagram showing constellation mapping according to the Embodiment of the invention.
Figure 8:
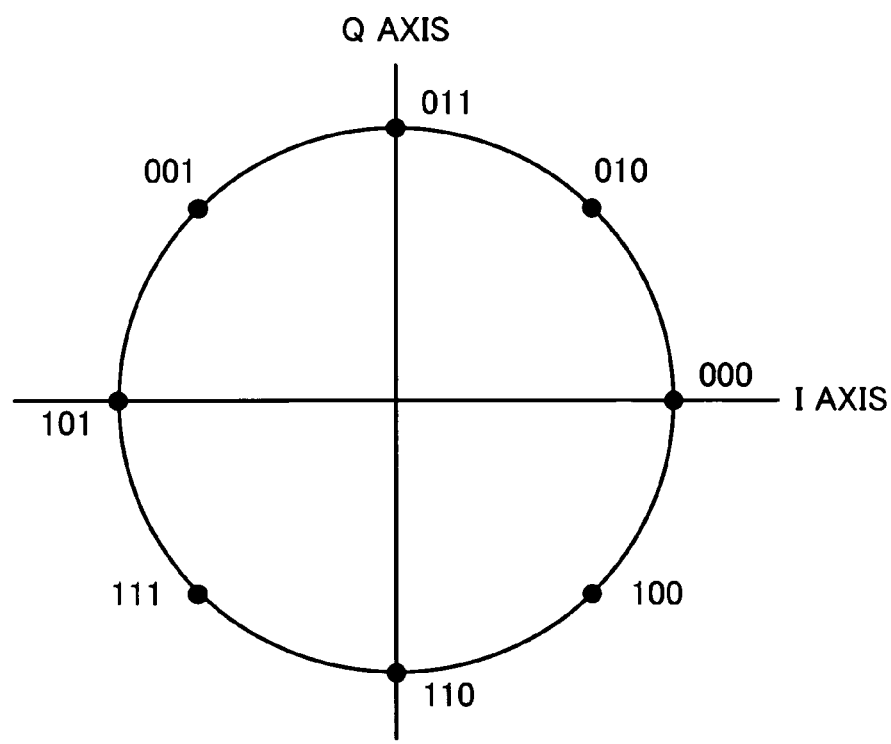
FIG. 8 is another diagram showing the constellation mapping according to the Embodiment of the invention.
Figure 9:
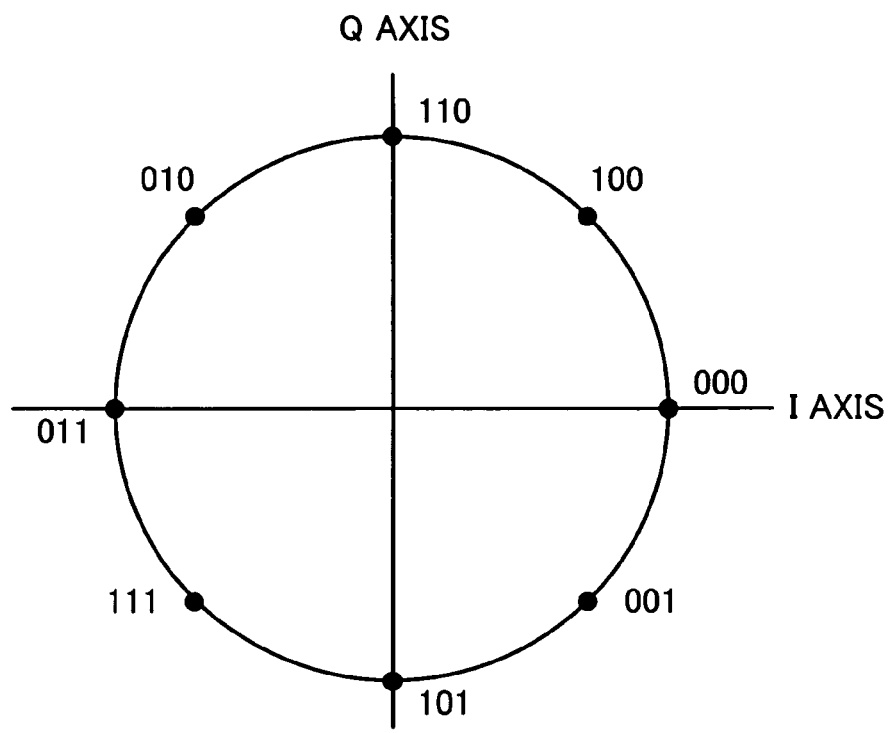
FIG. 9 is another diagram showing the constellation mapping according to the Embodiment of the invention.

When the number of transmission is two (in a first retransmission), arrangement determining section 103 determines Constellation 2 as a constellation pattern. More specifically, arrangement determining section 103 selects a SWAP method as a data interchanging rule of the constellation pattern. The SWAP method includes three schemes as shown in FIGS. 7 to 9. In other words, as shown in FIG. 7, the first scheme is to interchange data of the first bit and data of the second bit in each symbol data. As shown in FIG. 8, the second scheme is to interchange data of the second bit and data of the third bit in each symbol data. As shown in FIG. 9, the third scheme is to interchange data of the first bit and data of the third bit in each symbol data. Arrangement determining section 103 selects any one from among the three schemes. Interchange of the data to vary the bit arrangement as shown in FIGS. 7 to 9 is performed in data interchanging section 105.

Figure 10:
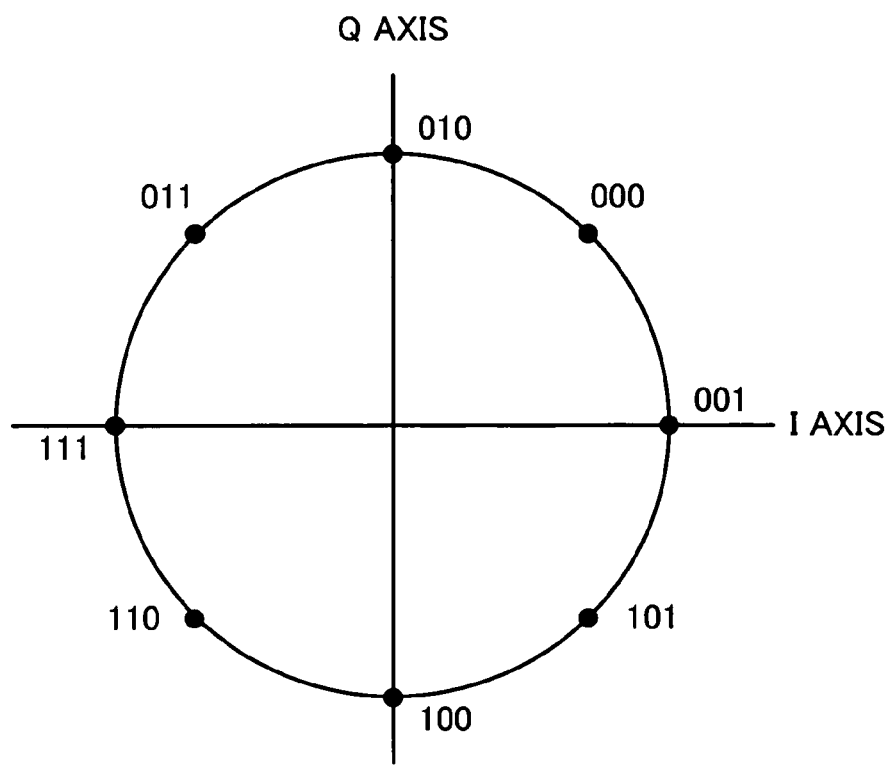
FIG. 10 is another diagram showing the constellation mapping according to the Embodiment of the invention.

When the number of transmissions is three (in a second retransmission), arrangement determining section 103 determines Constellation 3 as a constellation pattern. More specifically, arrangement determining section 103 selects an Inversion method as a data interchanging rule of the constellation pattern. As shown in FIG. 10, the Inversion method is changing "0" that is data of the third bit to "1", while changing "1" that is data of the third bit to "0", in each symbol data. Interchanging the data of the third bits by data interchanging section 105 makes it possible to make these changes.

Figure 11:
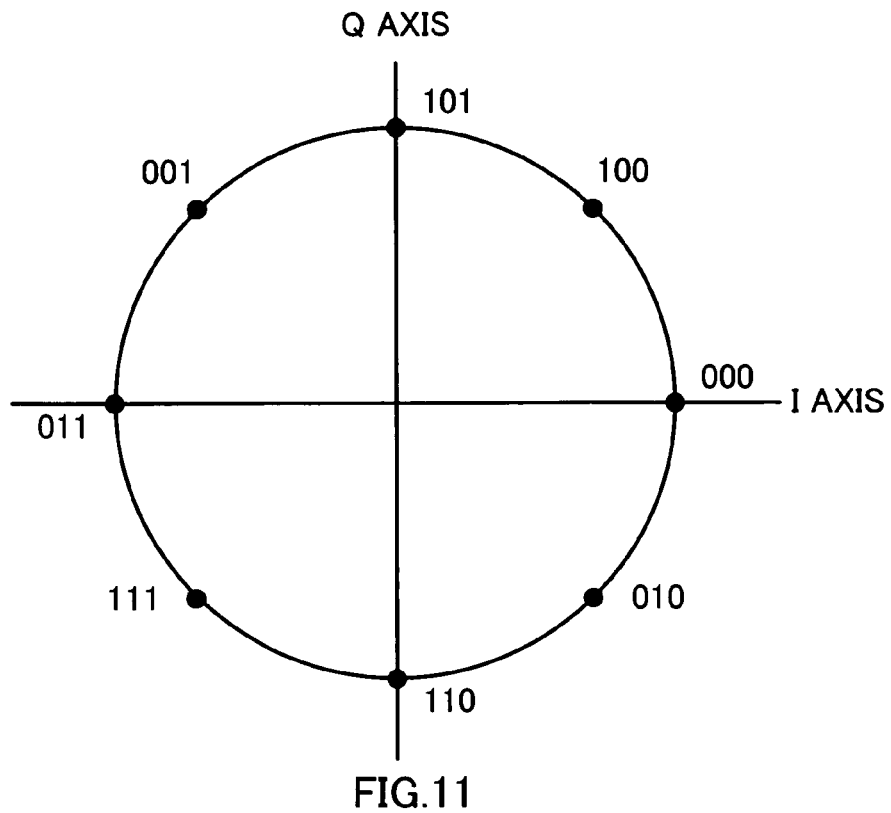
FIG. 11 is another diagram showing the constellation mapping according to the Embodiment of the invention.
Figure 12:
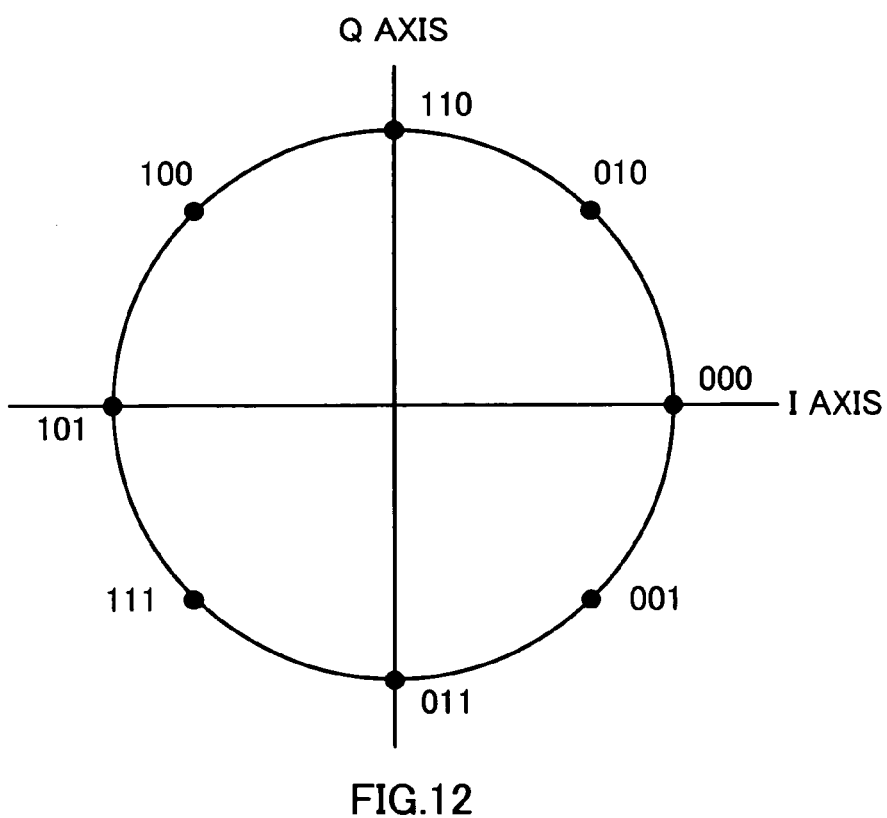
FIG. 12 is another diagram showing the constellation mapping according to the Embodiment of the invention.

When the number of transmissions is four (in a third retransmission), arrangement determining section 103 determines Constellation 4 as a constellation pattern. More specifically, arrangement determining section 103 selects a Rotational Shift method as a data interchanging rule of the constellation pattern. The Rotational Shift method has two schemes as shown in FIGS. 11 and 12. In other words, as shown in FIG. 11, the first scheme is to shift data of the first bit to the second bit, shift data of the second bit to the third bit, and further shift data of the third bit to the first bit, in each symbol data. As shown in FIG. 12, the second scheme is to shift data of the first bit to the third bit, shift data of the second to the first bit, and further shift data of the third bit to the second bit. Arrangement determining section 103 selects either one from the two schemes. Interchange of the data to vary the bit arrangement as shown in FIGS. 11 and 12 is performed in data interchanging section 105.

Figure 13:
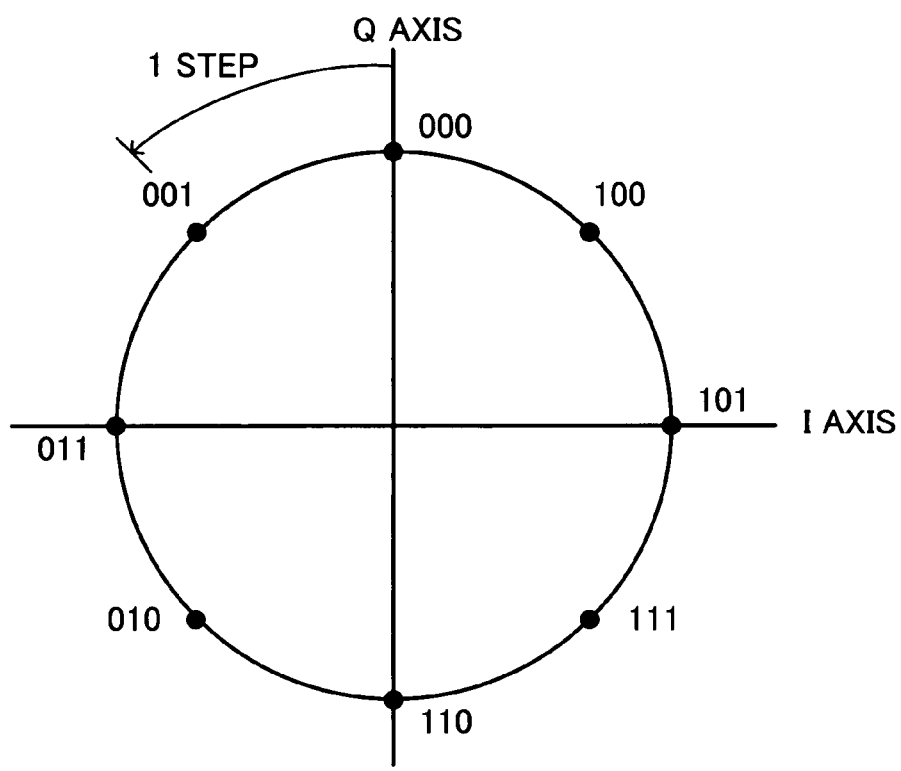
FIG. 13 is another diagram showing the constellation mapping according to the Embodiment of the invention.
Figure 14:
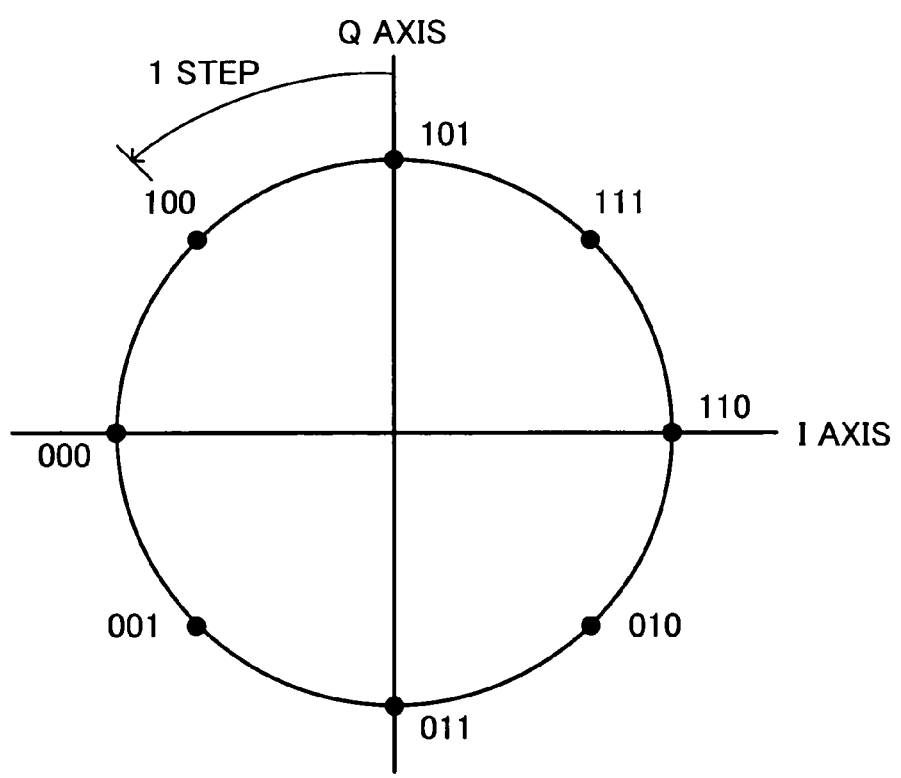
FIG. 14 is another diagram showing the constellation mapping according to the Embodiment of the invention.

When the number of transmission is five (in a fourth retransmission), arrangement determining section 103 determines Constellation 5 as a constellation pattern. More specifically, arrangement determining section 103 selects a Radius Circle Shift method as a data interchanging rule of the constellation pattern. The Radius Circle Shift method has two schemes as shown in FIGS. 13 and 14. In other words, as shown in FIG. 13, the first scheme is to rotate each symbol data by two steps counterclockwise in the IQ plane. In addition, one step means rotating some constellation mapping point to adjacent constellation mapping point. As shown in FIG. 14, the second scheme is to rotate each symbol data by four steps counterclockwise in the IQ plane. Arrangement determining section 103 selects either one from the two schemes. Thus, in the Radius Circle Shift method, by rotating the constellation mapping position of each symbol along the circumference of a circle with an intersection point of the I axis and Q axis as a center in the IQ plane, the constellation mapping point is varied. Shift of each symbol data to vary to the constellation mapping point in FIGS. 13 and 14 is performed in mapper section 106.

Figure 15:
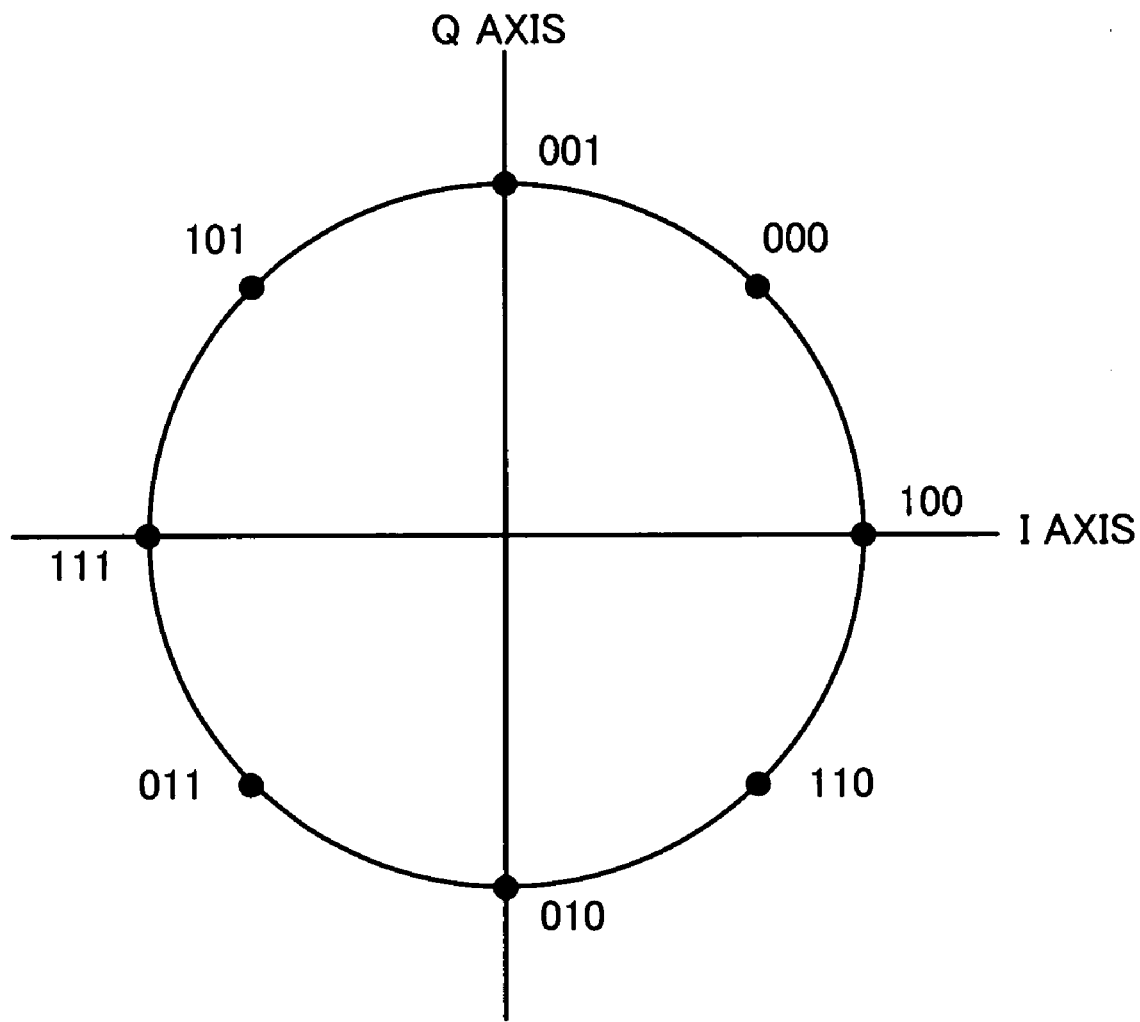
FIG. 15 is still another diagram showing the constellation mapping according to the Embodiment of the invention.

When the number of transmissions is six (in a fifth retransmission), arrangement determining section 103 determines Constellation 6 as a constellation pattern. More specifically, arrangement determining section 103 selects a Rotational shift & Inversion method as a data interchanging rule of the constellation pattern. As shown in FIG. 15, the Rotational Shift & Inversion method is to shift data of the first bit to the second bit, shift data of the second bit to the third bit, and further shift data of the third bit to the first bit, in each symbol data, while changing "0" that is data of the first bit to "1", and changing "1" that is data of the first bit to "0", in each shifted symbol data.

Interchange of the data to vary the bit arrangement as shown in FIG. 15 is performed in data interchanging section 105.

In addition, in the 8 PSK modulation scheme, each symbol data has the same amplitude, and an error of each bit is caused by a difference in phase decision region. Meanwhile, in the 16 QAM modulation scheme, the phase and amplitude differ between symbol data, and an error of each bit is caused by a difference in amplitude decision region in addition to the difference in phase decision region.

Thus, according to this Embodiment, since the bit arrangement in each symbol is varied corresponding to the number of retransmissions, a particular bit of each symbol can be prevented from being erroneous repeatedly, and it is thereby possible to prevent the error rate characteristic from degrading and further prevent deterioration of the throughput caused by repeated retransmissions. Further, according to this Embodiment, in the 8 PSK modulation scheme where each symbol data has the same amplitude, by simple processing for rotating a phase of each symbol by two steps or four steps, or for varying the bit arrangement in each symbol, it is possible to prevent a particular bit of each symbol from being erroneous repeatedly. Furthermore, according to this Embodiment, in the 8 PSK modulation scheme including the same amplitude, when data is retransmitted, each symbol is mapped in a constellation mapping position where the phase is rotated by two steps or four steps, and it is thus possible to transmit each symbol data via a different propagation path corresponding to the number of retransmissions. The effect by fading thus differs corresponding to the number of retransmissions, thereby enabling the time-space diversity effect to be produced, and it is possible to prevent an error from concentrating on particular symbol data.

In addition, in the above-mentioned Embodiment, a constellation mapping position of transmission data is varied in the 8 PSK modulation scheme. However, the invention is not limited thereto, and is applicable to modulation schemes such as 16 PSK, 32 PSK, 64 PSK and the like where each symbol data has the same amplitude. Further, in the above-mentioned Embodiment, symbol data is rotated by two steps or four steps in the Radius Circle Shift method, but not limited thereto, and may be rotated by any steps such as three steps and the like as well as two steps and four steps. Transmission apparatus 101 and reception apparatus 102 of the above-mentioned Embodiment are applicable to a base station apparatus and/or communication terminal apparatus. Further, in the above-mentioned Embodiment, the constellation mapping point is varied using either one of the SWAP, Inversion, Rotational Shift and Radius Circle Shift methods, but the invention is not limited thereto. The constellation mapping position may be varied in any combinations of the SWAP, Inversion, Rotational Shift and Radius Circle Shift methods. Moreover, in the above-mentioned Embodiment, the number of transmissions is associated with the data interchanging rule as shown in FIG. 6. However, the invention is not limited thereto, and association of the number of transmissions and data interchanging rule may be changed flexibly.

The present application is based on Japanese Patent Application No. 2003-341718 filed on Sep. 30, 2003, entire content of which is expressly incorporated by reference herein.

INDUSTRIAL APPLICABILITY

The present invention is suitable for use in a transmission apparatus and transmission method for performing retransmission of erroneous data.

The invention claimed is:

1. A transmission apparatus comprising:
   an arrangement determiner that determines a constellation mapping position indicating an arrangement position of each symbol data in the IQ plane when transmission data is retransmitted so that the constellation mapping position becomes different from that in a last transmission;
   a data assigner that assigns transmission data to each symbol so that each symbol data with the same amplitude is arranged in the constellation mapping position determined by the arrangement determiner; and
   a transmitter that transmits the transmission data that is assigned to each symbol in the data assigned, wherein:
   the arrangement determiner rotates the constellation mapping position of the last transmission by a predetermined angle that is common to all constellation mapping positions along a circumference of a circle with an intersection point of the I axis and Q axis as a center in the IQ plane, to determine the constellation mapping position when the transmission data is retransmitted.

2. A transmission method comprising the steps of:
   determining a constellation mapping position indicating an arrangement position of each symbol in the IQ plane when transmission data is retransmitted so that the constellation mapping position becomes different from that in a last transmission;
   assigning transmission data to each symbol so that each symbol data is arranged in the determined constellation mapping position; and
   transmitting the transmission data assigned to each symbol, wherein:
   the constellation mapping position of the last transmission is rotated b a predetermined angle that is common to all constellation mapping positions along a circumference of a circle with an intersection point of the I axis and Q axis as a center in the IQ plane, to determine the constellation mapping position when the transmission data is retransmitted.

3. A base station apparatus comprising the transmission apparatus of claim 1.

4. A communication terminal apparatus comprising the transmission apparatus of claim 1.

\* \* \* \* \*

UNITED STATES PATENT AND TRADEMARK OFFICE
CERTIFICATE OF CORRECTION

PATENT NO. : 7,672,394 B2 Page 1 of 1
APPLICATION NO. : 10/573688
DATED : March 2, 2010
INVENTOR(S) : Jinsong Duan et al.

It is certified that error appears in the above-identified patent and that said Letters Patent is hereby corrected as shown below:

Claim 1, column 8, line 27 in the Letters Patent which issued on March 2, 2010, reads:

"assigned to each symbol in the data assigned, wherein:"

and should read:

"assigned to each symbol in the data assigner, wherein:"

Claim 2, column 8, line 47 in the Letters Patent which issued on March 2, 2010, reads:

"is rotated b a predetermined angle that is common to all"

and should read:

"is rotated by a predetermined angle that is common to all"

Signed and Sealed this

Third Day of August, 2010

David J. Kappos
*Director of the United States Patent and Trademark Office*